United States Patent [19]

Ono

[11] 4,089,760
[45] May 16, 1978

[54] METHOD FOR REGENERATING WASTE DEVELOPERS USED FOR PROCESSING SILVER HALIDE PHOTOGRAPHIC MATERIALS AND METHOD FOR STORING DEVELOPERS

[75] Inventor: Takezo Ono, Mihara, Japan

[73] Assignee: Nippon Evr Limited, Japan

[21] Appl. No.: 606,610

[22] Filed: Aug. 21, 1975

[30] Foreign Application Priority Data

Aug. 30, 1974 Japan .................................. 49-98922
Jan. 24, 1975 Japan .................................. 50-9814
Feb. 26, 1975 Japan .................................. 50-22800

[51] Int. Cl.² .............................................. C25C 1/20
[52] U.S. Cl. ..................................... 204/109; 204/151
[58] Field of Search ................................. 204/109, 151

[56] References Cited

U.S. PATENT DOCUMENTS

| | | | |
|---|---|---|---|
| 3,004,909 | 10/1961 | Gregor et al. | 204/151 |
| 3,075,908 | 1/1963 | Kollsman | 204/151 |
| 3,296,112 | 1/1967 | Kollsman | 204/151 |
| 3,925,175 | 12/1975 | Fisch et al. | 204/109 |

Primary Examiner—R. L. Andrews
Attorney, Agent, or Firm—Wenderoth, Lind & Ponack

[57] ABSTRACT

A method for regenerating a spent developer used for processing silver halide photographic materials which comprises electrolyzing the spent developer using an electrolytic cell including an ion exchange membrane and composed of a cathode compartment and an anode compartment with the anode and the cathode being separated from each other by an anion exchange membrane, while charging the spent developer into the cathode compartment and an electrolytic solution into the anode compartment.

3 Claims, 2 Drawing Figures

METHOD FOR REGENERATING WASTE DEVELOPERS USED FOR PROCESSING SILVER HALIDE PHOTOGRAPHIC MATERIALS AND METHOD FOR STORING DEVELOPERS

This invention relates to a method for regenerating a waste developer used for processing silver halide photographic materials, and to a method for storing a developer for use in processing silver halide photographic materials.

Silver halide black-and-white photographic materials, after exposure for photographing or printing, are processed by a series of steps including development, fixation, rinsing and drying to form a photographic image thereon. Likewise, after being exposed for photographing or printing, silver halide color photographic materials are processed, in principle, by a process essentially comprising color development, bleaching, fixation, rinsing and drying to form a color photographic image although the method of processing differs somewhat according to the types of the color photographic materials. Since wastes of the developer, bleaching solution and fixer used for processing these photographic materials contain noxious substances, they have to be discarded after being treated by some method to render them non-noxious, or be re-used after being subjected to some regeneration treatment, thus confining the wastes within the processing system.

Various methods of regeneration have been proposed to date for treating the used developer, bleaching solution and fixer.

Generally, the developer for silver halide photographic materials is an aqueous solution containing a developing agent, a preservative, an accelerator and an inhibitor. When the developing agent reacts with the exposed silver bromide or silver iodide in the emulsion layer of the photographic material, a silver image precipitates in the emulsion layer, and the oxidized developing agent and bromine or iodine ions are formed as by-products in the developer. In the case of the color development of a color photographic material, the oxidized developing agent combines with the color coupler in the emulsion layer to form a dye image. However, since the color developing agent and the preservative are susceptible to air oxidation, both black-and-white developers and color developers, after being spent, contain the oxidized developing agent, the oxidized preservative and bromine or iodine ions (inhibitor) built up therein.

In order to regenerate the spent developer, a method has previously been suggested in which the spent developer is passed through an ion-exchange resin to remove the bromine or iodine ions (John H. Priesthoff and John G. Stott, Journal of the SMPTE, Vol. 65, pages 478 to 484, 1956). This method is certainly effective for removing bromine or iodine ions, but is insufficient for removing the oxidized developing agent. For example, a black-and-white developer has the defect that the developing agent such as hydroquinone adsorbs to the ion-exchange resin. Furthermore, when the bromine or iodine ions adsorb to the ion exchange resin to saturation, an additional step of regenerating the resin is required, and the method lacks simplicity.

Another method for regenerating the waste developer has been suggested in which the waste developer is electrodialyzed using an electrodialytic cell including an ion exchange membrane and composed of a cathode compartment, a plurality of deionation compartments (in which a cation exchange membrane is disposed on the cathode side and an anion exchange membrane on the anode side), a plurality of enionation compartments (in which an anion exchange membrane is disposed on the cathode side, and a cation exchange membrane on the anode side), and an anode compartment with the cathode and the anode being separated from each other by a number of anion exchange membranes and cation exchange membranes arranged alternately, while charging the waste developer into the deionation compartments and a solution of sodium sulfate into the enionation compartments, and passing a direct current between the cathode and the anode, thereby to remove bromine or iodine ions built up in the waste developer. (S. Mizusawa, A. Sasai and N. Mii, Bulletin of the Society of Scientific Photography of Japan, No. 18, 38–44, 1968). This method makes it possible to remove bromine or iodine ions accumulated in the waste developer, but the oxidized developing agent and the oxidized preservative cannot be eliminated, thus leading to an incomplete regeneration of the developer.

After the color development, the emulsion layers of a color photographic material contain a silver image and a dye image conjointly, and unless the silver image is removed, a clear dye image cannot be completely formed. The bleaching treatment is an operation whereby this silver image is converted to silver bromide which is soluble in the fixer.

When the silver image is treated with a bleaching solution comprising potassium ferricyanide and potassium bromide, the silver image becomes silver bromide in the emulsion, and potassium ferrocyanide is formed as a by-product in the bleaching solution. When hydrobromic acid and ozone are caused to act on the spent bleaching solution, the potassium ferrocyanide is oxidized to potassium ferricyanide, and potassium bromide is formed as a by-product, thus making it possible to reuse the bleaching solution. (T. W. Baker and T. J. Dagon, Image Technology, 13–25, June/July; 19–24, August/September, 1972)

When the above spent bleaching solution is oxidized by addition of potassium persulfate, the potassium ferrocyanide becomes potassium ferricyanide, thus making it possible to reuse the bleaching solution. (B. A. Huchins and L. E. West, Journal of the SMPTE, 66, 764, 1967)

The emulsion layer of a black-and-white photographic material after processing with a developer and the emulsion layer of a color photographic material after treatment with a bleaching solution both contain silver bromide or silver iodide remaining therein. The fixation is an operation whereby the silver bromide and silver iodide are dissolved and removed from the emulsion.

When the above silver bromide or silver iodide is treated with a fixer consisting mainly of sodium thiosulfate or ammonium thiosulfate, it changes to a silver thiosulfate complex salt, and is removed from the emulsion. On the other hand, the silver thiosulfate complex salt and bromine or iodine ions build up in the fixing bath.

When the spent fixing solution is electrolyzed in an electrolytic cell comprising a stainless steel cathode and a graphite anode, the silver ions dissociated from the silver thiosulfate complex salt is reduced at the cathode to precipitate metallic silver. The bromine or iodine ions are removed by secondary discharge at the anode. Hence, the fixing solution can be reused. This method of electrolytic regeneration of the spent fixing solution makes it possible to reuse the fixer and simultaneously recover silver, and has heretofore been used with good results in large developing laboratories. (R. P. Gyori and F. J. Scobey, Journal of the SMPTE, 81, 603–606, 1972)

The Japanese-language periodical "Motion Picture and Television Technology", No. 254, 34–40, October 1973 discloses a method for regenerating wastes of a bleaching solution and fixing solution simultaneously. This method involves the electrolysis of the waste fixer in a cathode compartment and the waste bleaching solution containing potassium ferricyanide in an anode compartment using an electrolytic cell in which a stainless steel cathode is separated from a graphite anode by means of an anion exchange membrane. According to this electrolytic method, the silver ions dissociated from the silver thiosulfate complex salt are reduced at the cathode to precipitate metallic silver. At the anode, ferrocyanide ions are oxidized to ferricyanide ions. Bromine ions in the catholyte solution migrate to the anode compartment through the anion exchange membrane, and therefore, the removal of the bromine ions in the waste fixing solution and the supply of bromine ions to the waste bleaching solution can be performed at the same time, thus resulting in the simultaneous regeneration of the waste fixing solution and the waste bleaching solution. This method of regeneration takes good advantage of a reducing reaction of silver ions at the cathode and an oxidation reaction of ferrocyanide ions at the anode, which are known reactions in the field of inorganic electrochemistry.

As described above, many developing laboratories are actually re-using the waste bleaching solution and fixing solution, but no satisfactory method for regenerating waste developers has been provided up to date.

It is an object of this invention therefore to provide a method for regenerating waste developers used for processing silver halide black-and-white or color photographic materials.

Another object of this invention is to provide a method for preventing water pollution in rivers and seas to be caused by the discharge of waste developers used for processing silver halide photographic material.

Still another object of this invention is to provide a method for preventing the oxidation of developers which are susceptible to air oxidation.

SUMMARY OF THE INVENTION

This invention embraces the following embodiments.

(1) A method for regenerating waste developers used for processing silver halide photographic materials which comprises electrolyzing the waste developer using an electrolytic cell including an ion exchange membrane and composed of a cathode compartment and an anode compartment with the cathode and the anode being separated from each other by an anion exchange membrane, while charging the waste developer into the cathode compartment and an electrolyte solution into the anode compartment.

(2) A method for regenerating waste developers used for processing silver halide photographic materials, which comprises electrolyzing the waste developer using an electrodialytic cell including an ion exchange membrane and composed of a cathode compartment, a plurality of enionation compartments, a plurality of deionation compartments and an anode compartment with the cathode and the anode being separated from each other by an anion exchange membrane, while charging the waste developer into the cathode compartment and the effluent from the cathode compartment into the deionation compartments.

(3) A method for regenerating developers used for processing silver halide photographic materials, which comprises using an electrolytic cell including an ion exchange membrane and composed of a cathode compartment and an anode compartment with the cathode and the anode being separated from each other by an anion exchange membrane, and an electrodialytic cell including an ion exchange membrane and composed of a cathode compartment, a plurality of enionation compartments, a plurality of deionation compartments and an anode compartment with the cathode and the anode being separated from each other by anion exchange membranes and cathon exchange membranes arranged alternately, and charging the waste developer into the cathode chamber of the electrolytic cell to electrolyze it and then charging the effluent from the cathode compartment into the deionation compartments of the electrodialytic cell to electrodialyze it.

(4) An apparatus for regenerating waste developers used for processing silver halide photographic materials, comprising an electrolytic cell including an ion exchange membrane and composed of a cathode compartment and an anode compartment with the cathode and the anode being separated from each other by an anion exchange membrane, and an electrodialytic cell including an ion exchange membrane and composed of a cathode compartment, a plurality of enionation compartments, a plurality of deionation compartments and an anode compartment wit the cathode and the anode being separated from each other by anion exchange membranes and cation exchange membranes arranged alternately, said cells being connected to each other by piping.

(5) A method for regenerating waste developers used for processing silver halide photographic materials, which comprises using an electrolytic cell including an ion exchange membrane and composed of a cathode compartment and an anode compartment with the cathode and the anode being separated from each other by a cation exchange membrane, and an electrodialytic cell including an ion exchange membrane and composed of a cathode, a plurality of enionation compartments, a plurality of deionation compartments and an anode compartment with the cathode and the anode being separated from each other by anion exchange membranes and cation exchange membranes arranged alternately, and charging the waste developer into the cathode compartment of the electrolytic cell to electrolyze it, and then charg ng the effluent from the cathode compartment into the deionation compartments of the electrodialysis cell to electrodialyze it.

(6) An apparatus for regenerating waste developers used for processing silver halide photographic materials, comprising an ion exchange electrolytic cell including an ion exchange membrane and composed of a cathode compartment an an anode compartment with the cathode and the anode being separated from each other by a cation exchange membrane and an electrodialytic cell including an ion exchange membrane and composed of a cathode, a plurality of enionation compartments, a plurality of deionation compartments and an anode compartment with the cathode and the anode being separated from each other by an anion exchange membrane and a cation exchange membrane, said cells being connected to each other by piping.

(7) A method for treating discharge liquids during the regeneration of waste developers for silver halide photographic materials, which comprises treating an effluent from an anode compartment of an electrolytic cell including an ion exchange membrane and composed of a cathode compartment and the anode compartment with the cathode and the anode being separated from each other by an anion exchange membrane and a discharge liquid from enionation compartments and an anode compartment of an electrodialytic cell including an ion exchange membrane and composed of a cathode, a plurality of the enionation compartments, a plurality of deionation compartments and the anode compartment with the cathode and the anode being separated from each other by anion exchange membranes and cation exchange membranes arranged alternately, with chlorine or a hypochlorite.

(8) A method for storing a developer for silver halide photographic materials, which comprises charging a solution of an acid into an anode of an electrolytic cell including an ion exchange membrane and composed of a cathode compartment and the anode compartment with the cathode and the anode being separated from each other by a cation exchange membrane, and the developer into the cathode compartment, and passing a direct current between the cathode and the anode.

(9) An apparatus for storing a developer for silver halide photographic materials, comprising an electrolytic cell including a cathode, an anode and a cation exchange membrane, the cation exchange membrane partitioning the electrolytic cell into an anode compartment and a cathode compartment, the anode compartment containing an anode and the cathode compartment containing a cathode; and means for passing a direct electric current between the cathode and the anode.

DETAILED DESCRIPTION OF THE INVENTION

The various embodiments of this invention will be described below with reference to the accompanying drawings.

Figure 1:
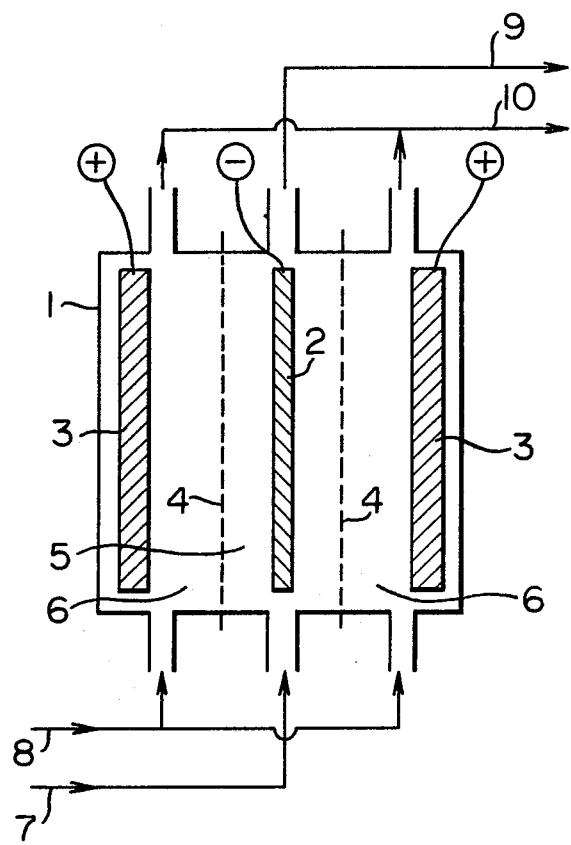
FIG. 1 is a schematic view of an electrolytic cell including an ion exchange membrane which is suitable for the performance of the present invention.

The process of regenerating a waste developer used for processing silver halide photographic materials in accordance with the embodiment (1) of this invention is shown in FIG. 1. Referring to FIG. 1, an electrolytic cell 1 including an ion exchange membrane is divided into a cathode compartment 5 and anode compartments 6 by separating a cathode 2 from anodes 3 by means of anion exchange membranes 4. The waste developer used for processing silver halide photographic materials is charged from a supply line 7 into the cathode compartment, and an electrolytic solution is charged into the anode compartments 6 from another supply line 8. The waste developer is electrolyzed by passing a direct current between the cathode 2 and the anodes 3. The developer recovered by the electrolysis flows out from an effluent line 9. The electrolytic solution flows out from another effluent line 10.

The cathode 2 is made of, for example, iron, nickel, lead, zinc, or stainless steel, and the anodes 3 are made of, for example, graphite, platinum, platinum-plated titanium, lead, or magnetite. Desirably, the anion exchange membranes 4 are of a strong base type anion exchange membrane. Examples of the electrolyte solution to be filled in the anode compartments 6 of the electrolytic cell 1 are an aqueous solution of an alkali such as sodium hydroxide or potassium hydroxide, an aqueous solution of a salt such as sodium sulfate or potassium sulfate, and an aqueous solution of an acid such as sulfuric acid. Preferably, the concentration of the electrolyte solution is generally 0.1 N. There is no particular upper limit to the concentration, but concentrations of not more than 1 N are sufficient.

The waste developer used for processing silver halide photographic materials is filled in the cathode compartment 5. The developing agent in the developer is a chemical which reduces only the latent image area of silver bromide or silver iodide in the emulsion layer but not the rest. Black-and-white developers contain such a developing agent as hydroquinone, methyl p-aminophenol sulfate salt, or 1-phenyl-3-pyrazolidone. Examples of the color developing agent in color developers include N,N-dialkyl-p-phenylenediamine-type compounds, such as diethyl p-phenylenediamine sulfate, hydroxyethyl ethyl p-phenylenediamine sulfate, 2-amino-5-diethyl aminotoluene hydrochloride, 4-amino-N-ethyl-N-($\beta$-methanesulfonamide ethyl)-m-toluidine sesquisulfate monohydrate, or 4-amino-N-hydroxyethyl-N-ethyl-m-toluidine sulfate.

The preservative in the developer is a chemical added in order to prevent the oxidation of the developing agent, and includes, for example, potassium sulfite, sodium sulfite, and sodium metabisulfite. The accelerator in the developer is a chemical which strengthens the reducing action of the developing agent, and includes, for example, alkalies such as sodium hydroxide or potassium hydroxide, and alkaline salts such as sodium carbonate, potassium carbonate, borax, or sodium metaborate. The inhibitor in the developer is a chemical which strongly inhibits the development of those areas of the photographic material which have been exposed insufficiently, and removes fog. Examples of the inhibitor are potassium bromide, sodium bromide, potassium iodide, and sodium iodide.

When the developing agent in the developer reacts with the exposed silver bromide or silver iodide of the emulsion layer, a silver image precipitates in the emulsion layer, and the oxidized developer agent, hydrogen ions and bromine or iodine ions are formed as by-products in the developer. The hydrogen ions disappear as a result of being neutralized with the accelerator in the developer. In the case of color development, the oxidized developing agent combines with a color coupler in the emulsion layer to form a dye image, and in the case of black-and-white development, it becomes one component of the waste developer. On the other hand, the developing agent, whether for color development or black-and-white development, is susceptible to air oxidation, and the preservative is likewise susceptible to air oxidation. Consequently, the oxidized developing agent, the oxidized preservative and bromine or iodine ions build up in the waste developer.

More specifically stated, when a black-and-white developing agent such as hydroquinone is oxidized, it changes to a quinone-type compound such as benzoquinone, and a part of it reacts with a sulfite present as the preservative to form a sulfone compound such as hydroquinone monosulfonate. Both of these compounds are accumulated in the waste developer. On the other hand, when a color developing agent such as an N,N-dialkyl-p-phenylenediamine compound undergoes air oxidation in the developer, it forms an azo dye-type compound and a quinone diimine compound. Part of the quinone diimine-type compound reacts with the sulfite preservative to form a sulfone compound such as an N,N-dialkyl-p-phenylenediamine monosulfonate. Both of these compounds are accumulated in the waste developer.

The type of the oxidized preservative differs of course according to the type of the preservative, but when sodium sulfite is used as the preservative, sodium sulfate is formed as the by-product oxidation product.

When the waste development used for processing silver halide photographic materials and having the abovementioned composition is charged into the cathode compartment 5 of the electrolytic cell 1 shown in FIG. 1 and a direct current is passed between the cathode 2 and the anodes 3, bromine or iodine ions in the waste developer migrate to the anode compartments 6 through the anion exchange membranes 4 and is thus removed. The oxidation product of the black-and-white developing agent, such as benzoquinone, and the oxidation product of the preservative, such as sodium sulfate, are reduced by a cathodic reaction, and revived respectively to the black-and-white developing agent and the preservative. The quinone diimine-type compound and the azo dye-type compound as the oxidation products of the color developing agent are reduced by a cathodic reaction, and thus revived to the color developing agent. The sulfonated product of the black-and-white developing agent, such as hydroquinone monosulfonate, and the sulfonated product of the color developing agent, such as an N,N-dialkyl-p-phenylenediamine monosulfonate, are revived respectively to the black-and-white developing agent and the color developing agent as a result of the sulfone group bonded to the benzene nucleus being replaced by strong hydrogen generated from the cathode. A part of each of the sulfonated products of the black-and-white developing agent and the color developing agent is dissociated to a sulfone anion-type compound of the black-and-white developing agent or the color developing agent, and migrates to the anode compartments 6 through the anion exchange membranes 4 and is thus removed.

Thus, the method of this invention in accordance with the embodiment (1) makes it possible to remove the oxidized developing agent, the oxidized preservative and bromine or iodine ions accumulated in the waste developer, and consequently, to re-use the revivied developer.

Figure 2:
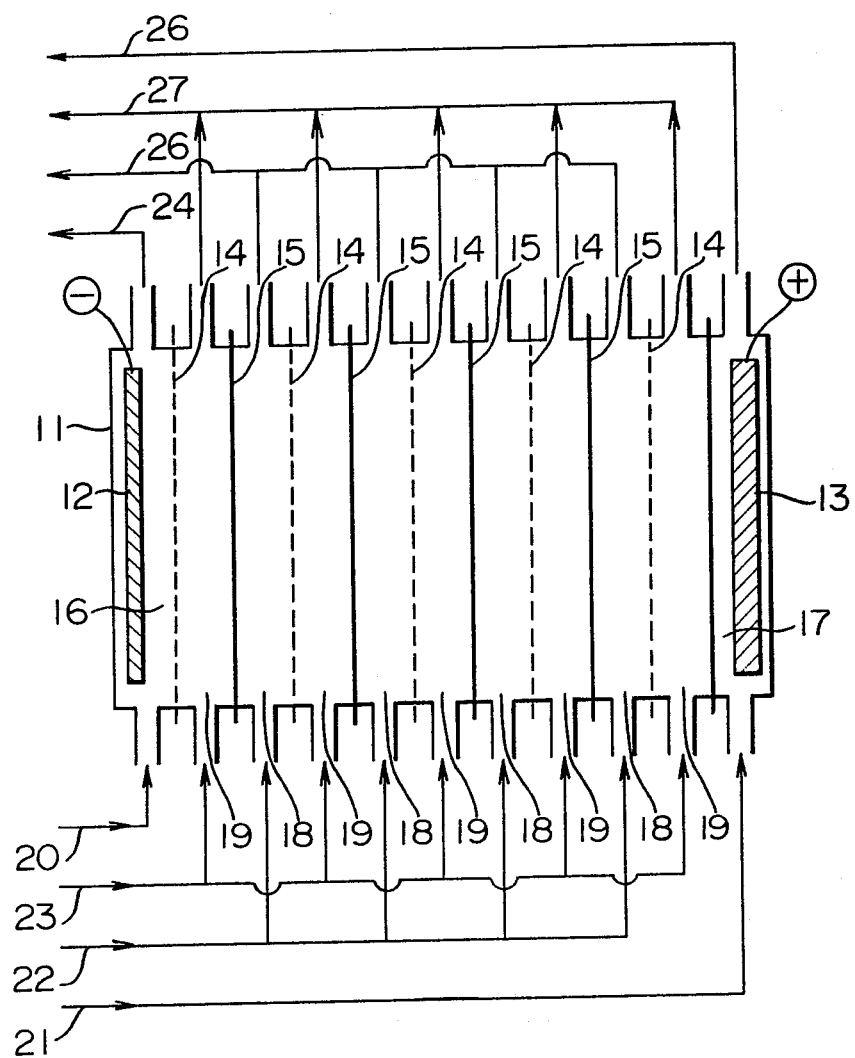
FIG. 2 is a schematic view of an electrodialytic cell including an ion-exchange membrane suitable for the performance of the present invention. In the drawings, the arrows show the directions in which the solution flows.

The process of regenerating the waste developer used for processing silver halide photographic materials by the method of this invention in accoreance with the embodiment (2) is shown in FIG. 2. Referring to FIG. 2, the reference numeral 11 represents an electrodialytic cell with an ion exchange membrane; 12, a cathode; 13, anodes; 14, anion exchange membranes; 15, a cation exchange membrane; 16, a cathode compartment; 17, anode compartments; 18, deionation compartments (in which the cation exchange membrane is disposed on the cathode side, and the anion exchange membrane on the anode side); 19, an enionation compartment (in which the anion exchange membrane is disposed on the cathode side, and the cation exchange membrane on the anode side); 20, a line for supplying the solution to the cathode compartment; 21, a line for supplying the solution to the anode compartment; 22, a line for supplying the solution to the deionation compartment; 23, a line for supplying the solution to the deionation compartments; 24, a line for flowing out the solution from the cathode compartment; 25, a line for flowing out the solution from the anode compartment; 26, a line for flowing out the solution from the deionation compartment; and 27, a line for flowing out the solution from the enionation compartment.

The cathode 12 is made of, for example, iron, nickel, lead, zinc, or stainless steel, and the anode 13 is made of, for example, graphite, platinum, platnium-plated titanium, lead, or magnetite. Preferably, the anion exchange membranes 14 are of a strong base type anion exchange membrane, and the cation exchange membranes 15 are of a strong acid type cation exchange membrane. An aqueous solution of an alkali such as sodium hydroxide or potassium hydroxide, an aqueous solution of a salt such as sodium sulfate or potassium sulfate, or an aqueous solution of an acid such as sulfuric acid is charged into the anode compartment 17 and the enionation compartments 19. Preferably, the concentration of the electrolyte solution is generally 0.1 N. There is no particular upper limit to the concentration, and concentrations of not more than 1N are usually sufficient. The waste developer used for processing silver halide photographic materials is charged into the cathode compartment 16. The effluent from the cathode compartment 16 is charged into the deionation compartments 18. As shown in FIG. 2, the effluent from the cathode compartment 16 may be supplied to the deionation compartments 18 arranged in parallel to each other or in series through pipelines. The cathode compartment 16, the deionation compartments 18, the enionation compartments 19, and the anode compartment 17 need to be insulated so that no electric current flows among them.

When the waste developer used for processing silver halide photographic materials is charged into the cathode compartment 16 of the electrodialytic cell 11 shown in FIG. 2 and an electric current is flowed between the cathode 12 and the anode 13, the oxidized black-and-white developing agent, such as benzoquinone, and the oxidized preservative such as sodium sulfate are reduced by a cathodic reaction, and revived to the black-and-white developing agent and the preservative, respectively. Of the oxidized products of the color developing agent, the quinone diimine-type compound and the azo dye-type compound are reduced by a cathodic reaction, and revived to the color developing agent. The sulfonated black-and-white developing agent such as hydroquinone monosulfonate and the sulfonated color developing agent such as an N,N-dialkyl-p-phenylenediamine monosulfonate are revived to the black-and-white developing agent and the color developing agent as a result of the sulfone group bonded to the benzene nucleus being replaced by strong hydrogen generated from the cathode. When the cathode compartment 16 is separated from the anion exchange membranes 14, bromine or iodine ions and the sulfone anion-type compound of the developing agent dissociated from the sulfonated product of the blackand-white or color developing agent migrate to the enionation compartments 19 through the anion exchange membrane 14. Furthermore, a cation (for example, a sodium ion) in the solution in the deionation compartment migrates to the enionation compartments 19 through the cation exchange membrane 15 and is thus removed. As a result, the concentrations of bromine or iodine ions, the anion-type compound and cation, etc. in the deionation compartments 18 are decreased (namely, deionation occurs), and the concentrations of these ions increase in the enionation compartments (namely, enionation occurs).

When the cathode compartment 16 is separated by means of the ion exchange membranes 14 as in the electrodialytic cell 11 shown in FIG. 2, the waste developer can be regenerated merely by charging it into the cathode compartment 16. However, when the waste developer is charged into one cathode compartment and a plurality of deionation compartments in accordance with the method of embodiment (2), a great amount of it can be regenerated at a low installation cost. Generally, the rate of reduction of the oxidized developing agent and the oxidized preservative is faster than the rate of removing bromine or iodine ions and the anion-type compound, but according to this method of the present invention, the rate of reduction and the rate of removal may be equilibrated.

In the performance of the embodiment (2) of the present invention, the waste developer is first charged into the cathode compartment 16 and the deionation compartments 18, and an electrolyte solution is charged into the anode compartment 17 and the enionation compartments 19 to electrolyze the waste developer. When the electrolysis has proceeded to a certain extent and the oxidation product present in the developer is reduced to some extent, the effluent from the cathode compartment 16 is charged into the deionation compartments 18. The effluent 26 derived from the waste developer originally charged into the deionation compartments 18 is charged into the cathode compartment 16.

The waste developer can be regenerated even by first charging it into the deionation compartments 18, and then charging the effluent 26 from the deionation compartments 18 into the cathode compartment 16. It should be understood that this modified method also lies within the scope of this invention.

According to the method of embodiment (3), the waste developer is regenerated by charging it into the cathode compartment 5 of the electrolytic cell shown in FIG. 1, electrolyzing it while pouring the electrolyte solution into the anode compartments 6, and then charging the effluent 9 from the cathode compartment 5 into the deionation compartments 18 of the electrodialytic cell 11 shown in FIG. 2 to electrodialyze it. At this time, the above-mentioned electrolyte solution is charged into the cathode compartment 16, the enionation compartments 19 and the anode compartment 17 of the electrodialytic cell 11. Preferably, the concentration of the electrolyte solution is about 0.1 N. There is no particular upper limit to it, but concentrations of not more than 1 N are usually sufficient.

The oxidized developing agent and the oxidized preservative in the waste developer are reduced in the cathode compartment 5, and bromine or iodine ions and a part of the anion-type compound migrate to the anode compartment 6 through the anion exchange membrane 4 and are thus removed. When the effluent 9 from the cathode compartment 5 is charged into the deionation compartments 18 and electrodialyzed, the bromine or iodine ions and the anion-type compound remaining in the effluent 9 migrate to the enionation compartments 19 through the anion exchange membrane 14. Thus, the components accumulated in the waste developer are removed to revive the developer.

The method of embodiment (3) also has the advantage that the rate of reducing the oxidized developing agent and the oxidized preservative can be equilibrated with the rate of removing the bromine or iodine ions and the anion-type compound at the anion exchange membrane, and a great quantity of the waste developer can be regenerated at a low installation cost.

The waste developer can also be regenerated by first charging it onto the deionation compartments 18 to electrodialyze it, and then charging the effluent 26 from the deionation compartments 18 into the cathode compartment 5 to electrolyze it. It should be understood that this modified method is also included within the scope of this invention.

The apparatus in accordance with the embodiment (4) of this invention is constructed by connecting the electrolytic cell shown in FIG. 1 to the electrodialytic cell shown in FIG. 2 by suitable pipelines so that the liquid to be treated, that is, the electrolytic solution or dialytic solution, may flow into the electrodialytic cell or the electrolytic cell. The waste developer used for processing silver halide photographic materials can be easily regenerated by performing the method of the embodiment (3) using this apparatus.

According to the method of embodiment (5) of this invention, the waste developer can be regenerated by charging it into a cathode compartment of an electrolytic cell composed of the cathode compartment and an anode compartment with the cathode and the anode being separated from each other by a cation exchange membrane (the same electrolytic cell as shown in FIG. 1 except that the cation exchange membrane is used instead of the anion exchange membranes 4) and electrolyzing it while charging the electrolyte solution into the anode, then charging the effluent from the cathode into the deionation compartments 18 of the electrodialytic cell 11 shown in FIG. 2 to electrodialyze it. At this time, the electrolyte solution is charged into the cathode compartment 16, the enionation compartments 19 and the anode compartment 17.

In the cathode compartment of the above electrolytic cell in which the cathode is separated from the anode by the cation exchange mebrane, the oxidized developing agent and the oxidized preservative in the waste developer are reduced. When the effluent from the cathode compartment is poured into the deionation compartments 18 of the electrodialytic cell shown in FIG. 2 and electrodialyzed, bromine or iodine ions and the anion-type compound in the effluent migrate into the anode compartments 19 through the anion exchange membranes 14. Thus, the components accumulated in the waste developer are removed to revive the developer.

The method of the embodiment (5), like the methods of the embodiments (2) and (3), has the advantage that the rate of reducing the oxidized developing agent and the oxidized preservative can be equilibrated with the rate of removing the bromine or iodine ions and the anion-type compound, and a large quantity of the waste developer can be regenerated at a small installation cost.

The apparatus in accordance with the embodiment (6) of this invention is constructed by connecting an electrolytic cell with an ion exchange membrane composed of a cathode compartment and an anode compartment with the cathode and the anode being separated from each other by a cation exchange membrane (the same electrolytic cell as shown in FIG. 1 except that the cation exchange membrane is used instead of the anion exchange membranes 4) to the electrodialytic cell shown in FIG. 2 by suitable pipelines so that the liquid to be processed, that is, the electrolytic solution or the electrodialytic solution, may flow into the electrodialytic cell or the electrodialytic cell. The waste developer used for processing silver halide photographic materials can be easily regenerated by performing the method of the embodiment (5) using this apparatus.

In the electrolysis or electrodialysis in accordance with the methods of the embodiments (1), (2) and (5) described above, hydrogen gas evolves from the cathode and the pH of the catholyte solution increases. Furthermore, oxygen gas evolves from the anode, and the pH of the anolyte solution decreases. Accordingly, an acid or alkali may be added to the catholyte or anolyte solution to maintain the pH of the catholyte or anolyte solution constant.

In the above electrolysis or electrodialysis, the current density of the anion exchange membrane or cation exchange membrane depends upon the concentration of bromine ions. When the concentration of bromine ions is about 0.02 gram equivalent/liter, the desirable current density is 2 to 10 mA/cm$^2$.

The developer revived by the methods of the embodiments (1), (2), (3) and (5) of this invention is re-used either as such or after replenishing it with wanted components so that its composition becomes the same as that of the original developer. If desired, the hydrogen ion concentration of the revived developer is adjusted by using an alkaline accelerator or sulfuric acid. In particular, in the regeneration of a waste black-and-white developer, a part of hydroquinone as a developing agent migrates into the anode compartment or deionation compartments through an anion exchange membrane. Accordingly, this loss needs to be made up for. In the case of regenerating a waste color developer used for processing color photographic materials, the revived developer must be replenished corresponding to the amount of the developing agent coupled with the coupler of the photographic material and the amount of the developing agent which has passed through the anion exchange membrane as a sulfonated anion-type compound.

In short, the methods in accordance with the embodiments (1), (2), (3) and (5) of this invention are a method for regenerating the waste developer used for processing silver halide photographic materials by utilizing, either simultaneously or separately, an expedient of reducing oxidation products of the developing agent and the preservative accumulated in the waste developer by an electrochemical cathodic reaction, and an expedient of removing bromine or iodine ions and a sulfonated anion-type compound derived from the developing agent electrodialytically by means of an anion exchange membrane.

According to these methods, a revivied developer decolorized to the same color as the original developer can be obtain as a result of the reduction of the oxidation products of the developing agent in the waste developer, and chemicals for formulating the developer can be markedly saved, and moreover, the waste developer can be reused. Accordingly, water pollution in rivers and seas caused by the waste developer can be eliminated.

One of the above-described known methods which comprises using an electrodialytic cell with an ion exchange membrane composed of a cathode compartment, a plurality of deionation compartments, a plurality of enionation compartments and an anode compartment with the cathode and the anode being separated from each other by a number of anion exchange membranes and cation exchange membranes arranged alternately, charging the waste developer into the deionation compartments and an aqueous solution of sodium sulfate into the enionation compartments, and electrodialyzing the waste developer by passing a direct current between the cathode and the anode is not acceptable for practical purposes because it cannot remove the oxidation products of the developing agent and the preservative although it can remove bromine and iodine ions in the waste developer. In contrast, the methods of this invention described above can remove not only bromine or iodine ions but also the oxidation products of the color developing agent and the preservative, and therefore, can regenerate the waste developer on a commercial basis.

When the waste developer is regenerated by the methods of the embodiments (1), (2), (3) and (5) of this invention, the electrolyte solution discharged from the anode compartments 6 of the electrolytic cell 1 or from the enionation compartments 19 and the anode compartment 17 has a COD (chemical oxygen demand) of about 200 to 20 ppm. This is because a part of the developing agent component in the waste developer or the sulfonated anion-type organic compound derived from the developing agent migrates to the anode compartment or enionation compartments through the anion exchange membrane. Although the COD of about 200 to 20 ppm in the effluent from the anode compartment and the effluent from the enionation compartments is low as compared with the COD of 30,000 to 3,000 ppm in the waste developer, some treatment to reduce it is required. By treating the effluent from the anode compartment and the effluent from the enionation compartments with chlorine or a hypochlorite in accordance with the method of embodiment (7), the COD can be drastically reduced. This method is quite unexpected in view of the fact that treatment of the waste developer with chlorine or a hypochlorite does not so much reduce COD. Chlorine gas or chlorine water can be used as the chlorine used in this method. Examples of the hypochlorite are sodium hypochlorite, potassium hypochlorite and calcium hypochlorite in the form of a solution or slurry. The sufficient amount of chlorine or the hypochlorite is about 5 g, calculated as available chlorine, per gram of COD of the effluent from the anode or the enionation compartments. Thus, according to this method, environmental pollution by the waste developer is completely eliminated.

In spite of the fact that the developer contains a preservative, the developing agent is susceptible to air oxidation during storage, and therefore, its developing action is reduced. This tendency is especially remarkable with color developers containing a preservative in a low concentration.

The oxidation of the developing agent and the preservative can be prevented and the pH of the developer can be maintained constant by filling the developer in a cathode compartment of an electrolytic cell with an ion exchange membrane composed of the cathode compartment and an anode compartment with the cathode and the anode being separated from each other by a cation exchange membrane, and a solution of an acid in the anode, and passing a direct current between the cathode and the anode.

Suitably, in the method of the embodiment (8), the same cathode and anode as in the case of the electrolytic cell with an ion exchange membrane are used, and a strong acid type cation exchange membrane is used as the cation exchange membrane. Preferably, cation exchange membranes having a low electric resistance whose performance is not reduced by being immersed in the developing agent or acids are chosen. The acid to fill the anode compartment is, for example, a solution of sulfuric acid, phosphoric acid, nitric acid, boric acid, or acetic acid. The concentration of the acid in the solution is 0.1N or more. There is no particular limit, but for commercial operations, concentrations in the range of 0.1 to 1N are used. In the performance of this method, the sufficient strength of the current (direct current) is 0.5 to 10 mA per 10 liters of the developer to be stored. Preferably, the current density of the cation exchange membrane is 1 to 30 mA/cm$^2$, and the current density of the cathode and the anode is 10 to 100 mA/cm$^2$.

When a solution of an acid is filled in the anode compartment of an electrolytic cell including an ion exchange membrane and the developer in the cathode compartment, and a direct current is passed between the anode and the cathode in accordance with the method of the embodiment (8), oxygen gas and a hydrogen ion are generated at the anode. The hydrogen ion migrates from the anode compartment to the cathode compartment through the cation exchange membrane to carry electricity. At the cathode, hydrogen gas and a hydroxyl ion are generated. Since the hydroxyl ion is neutralized by the hydrogen ion which has migrated through the cation exchange membrane, the pH of the catholyte solution (developer) can be maintained constant. Furthermore, because the developing agent and the preservative are prevented from oxidation by a cathodic reaction, their concentrations can be maintained constant during storage. The concentrations of the accelerator (hydroxyl ion) and the inhibitor (bromine or iodine ions) can also be maintained always constant because they cannot permeate through the cation exchange membrane.

When the method of the embodiment (8) is applied to the storage of a developer for silver halide photographic materials, it can be stored for long periods of time without degeneration. By applying this method to a developer being used, it can be stored for long periods of time without changes in its properties.

The apparatus in accordance with the embodiment (9) is suitable for performing the method of the embodiment (8). It is partitioned into an anode compartment and a cathode compartment by a cation exchange membrane so that a solution of an acid is charged into the anode compartment and the developer, into the cathode compartment, and an electric current can be passed between the anode and the cathode. As one example of application, this apparatus also embraces an apparatus for storing developers in which a solution of an acid is filled in a receptacle for an anode compartment composed of a cation exchange membrane with its top surface being opened, and the receptacle is immersed in a developer storage tank (or a developer bath of a processor), and an electric current is passed between an anode provided in the above receptacle and a cathode immersed in the developer storage tank but connected to the receptacle.

The above-described embodiments (1) to (9) of this invention can be used for regenerating or storing wastes of both black-and-white and color developers.

The following Examples illustrate the present invention more specifically.

EXAMPLE 1

A black-and-white silver halide photographic film was developed using a developer having the composition shown in column A in Table 1. The waste developer (column B) was filled in cathode compartment 5 of an electrolytic cell with an ion exchange membrane of the type as shown in FIG. 1 in which a lead cathode was separated from a graphite anode by a strong base type anion exchange membrane having permselectivity for monovalent anions. A 0.5N aqueous solution of sodium sulfate was filled in anode compartments 6. Electrolysis was performed while maintaining the current density of the ion exchange membrane at 8 mA/cm$^2$. After electrolyzing for 3 hours, the composition of the waste developer B changed to that shown in column C in Table 1. Hydroquinone, 1-phenyl-3-pyrazolidone, anhydrous sodium sulfite, borax and sulfuric acid (for pH adjustment) were added to the electrolyzed developer C to form a revived developer having the composition shown in column D in Table 1. Using the revived developer, a black-and-white photographic film was developed under the same conditions as in the case of the developer A, the photographic characteristics of the developed image were the same as in the case of the developer A.

Table 1

| Developer chemicals | A Developer | B Waste developer | C Electrolyzed developer | D Revived developer |
|---|---|---|---|---|
| Hydroquinone (g/l) | 8.0 | 6.8 | 7.5 | 8.0 |
| 1-Phenyl-3-pyrazolidone (g/l) | 0.24 | 0.22 | 0.23 | 0.24 |
| Anhydrous sodium sulfite (g/l) | 85.0 | 73.0 | 82.0 | 85.0 |
| Borax (g/l) | 1.00 | 0.97 | 0.98 | 1.00 |
| Bromine ion (as potassium bromide) (g/l) | 1.0 | 2.0 | 1.0 | 1.0 |
| pH | 8.50 | 8.45 | 8.80 | 8.50 |

The electric power required for the above electrolysis was 0.025 KWH per liter of the electrolyzed developer.

EXAMPLE 2

A color developer having the composition and color described in column A of Table 2 was fed into a developing chamber of a silver halide color photographic film processor, and a color print film was developed. The waste color developer (column B of Table 2) discharged from the developing chamber was charged into cathode compartment 5 of an electrolytic cell including an ion exchange membrane such as shown in FIG. 1 in which a stainless steel cathode was separated from a platinum anode by a strong base type anion exchange membrane, and a 0.5 N aqueous solution of sodium sulfate was charged into anode compartment. Electrolysis was performed while maintaining the current density of the anion exchange membrane at 5 mA/cm$^2$. The composition and color of the electrolyzed developer that flowed from the cathode compartment 5 were as shown in column C of Table 2.

2-Amino-5-diethyl aminotoluene hydrochloride, anhydrous sodium sulfite, sodium carbonate monohydrate, potassium bromide and sulfuric acid (for pH adjustment) were added to the electrolyzed developer C to form revived color developer (column D of Table 2).

A color print film was developed under the same conditions as in the case of the color developer A using the revived developer. The photographic characteristics of the developed color image were the same as in the case of the color developer A.

Table 2

| Developer chemicals | A Color developer | B Waste color developer | C Electrolyzed color developer | D Revived color developer |
|---|---|---|---|---|
| 2-Amino-5-diethyl aminotoluene hydrochloride (g/l) | 6.8 | 3.0 | 3.3 | 6.8 |
| Anhydrous sodium sulfite (g/l) | 5.7 | 4.0 | 5.0 | 5.7 |
| Sodium carbonate monohydrate (g/l) | 22.0 | 20.0 | 21.0 | 22.0 |
| Bromine ions (calculated as potassium bromide) (g/l) | 1.7 | 2.2 | 1.7 | 1.7 |
| pH | 11.08 | 10.65 | 11.20 | 11.08 |
| Color | pale yellow | red-brown | pale yellow | pale yellow |

The electric power required for the above electrolysis was 0.020 KWH per liter of the electrolyzed color developer.

EXAMPLE 3

A color developer having the composition shown in column A of Table 3 was supplied to a developing chamber of a color paper processor to develop the color paper. The waste color developer (having the composition shown in column B of Table 3) discharged from the developing chamber of the processor was charged into a cathode compartment 16 and deionation compartments 18 of an electrodialytic cell of the type shown in Table 2 in which a stainless steel cathode was separated from a graphite anode by five strong base type anion exchange membranes and five strong acid type cation exchange membranes disposed alternately, and a 0.3N aqueous solution of sodium sulfate was charged into enionation compartments 19 and an anode compartment 17. A direct current was passed between the cathode and the anode so that the current density of the anion and cation exchange membranes became 3 mA/cm².

When the above electrolysis proceeded to some extent, the effluent 24 from the cathode 16 was charged into the deionation compartments 18 and the electrolysis was continued. The waste developer which had so far flowed out from the deionation compartments was charged into the cathode compartment 16.

When the electrolysis took the stationary state, the compositions of the effluent from the cathode compartment 16 and the effluent from the deionation compartments 18 were as shown in columns C and D of Table 3. Hydroxyethyl ethyl para-phenylenediamine sulfate, anhydrous sodium sulfite, potassium carbonate, potassium bromide and sulfuric acid (for pH adjustment) were added to the effluent D from the deionation compartments to form a revived color developer (having the composition shown in column E of Table 3). A color paper was developed with the revived developer under the same conditions as in the case of the above color developer A. The properties of the color photograph obtained were the same as in the case of the color developer A.

Table 3

| Developer chemicals | A Color developer | B Waste color developer | C Effluent from the cathode compartment | D Effluent from the deionation compartments | E Revived color developer |
|---|---|---|---|---|---|
| Hydroxyethyl ethyl p-phenylenediamine sulfate (g/l) | 7.5 | 6.0 | 6.3 | 6.3 | 7.5 |
| Anhydrous sodium sulfite (g/l) | 4.5 | 4.0 | 4.2 | 4.1 | 4.5 |
| Potassium carbonate (g/l) | 100.0 | 99.0 | 99.5 | 99.0 | 100.0 |
| Bromine ion (g/l, calculated as potassium bromide) | 0.2 | 1.0 | 0.8 | 0.1 | 0.2 |
| pH | 10.8 | 10.7 | 11.0 | 11.0 | 10.8 |

The electric power required for the above regeneration treatment was 0.030 KWH per liter of the waste color developer.

EXAMPLE 4

A developer having the composition shown in column A of Table 4 was fed into a developing chamber of a black-and-white film processor, and a black-and-white silver halide photographic film was developed. The waste developer (having the composition shown in column B of Table 4) discharged from the developing chamber was charged into a cathode compartment 5 of an electrolytic cell of the type shown in FIG. 1 in which a stainless steel cathode was separated from a platinum-plated titanium anode by a strong base type anion exchange membrane having permselectivity for monovalent anions, and a 0.5N aqueous solution of sodium sulfate was charged into anode compartments 6. Electrolysis was carried out while maintaining the current density of the anion exchange membranes 4 at 5 mA/cm².

The electrolyzed developer (having the composition shown in column C of Table 4) that flowed out from the cathode compartment 5 was charged into deionation compartments 18 of an electrodialytic cell of the type shown in FIG. 2 in which a stainless steel cathode was separated from a graphite anode by five strong base type anion exchange membranes having permselectivity for monovalent anions and five strong acid type cation exchange membranes having perselectivity for monovalent cations arranged alternately, and a 0.5N aqueous solution of sodium sulfate was charged into a cathode compartment 16, enionation compartments 19 and an anode compartment 17. Electrodialysis was carried out while maintaining the current density of each of the ion exchange membranes at 5 mA/cm$^2$. The composition of the dialyzed developer that flowed out of the deionation compartments 18 was as shown in column D of Table 4.

Hydroquinone, methyl para-aminophenol sulfate, anhydrous sodium sulfite, sodium carbonate and sulfuric acid (for pH adjustment) were added to the dialyzed developer D to form a revived developer (having the composition shown in column E of Table 4). A black-and-white silver halide photographic film was developed with the revived developer under the same conditions as in the case of the developer A. The characteristics of the photograph obtained were the same as in the case of the developer A.

and a 0.5N aqueous solution of sulfuric acid was charged into an anode compartment. Electrolysis was carried out while maintaining the current density of the cation exchange membrane at 4 mA/cm$^2$.

The electrolyzed color developer (having the composition shown in column C of Table (5) that flowed out from the cathode compartment of the above electrolytic cell was charged into deionation compartments 18 of an electrodialytic cell of the type shown in FIG. 2 in which a stainless steel cathode was separated from a graphite anode by five strong base type anion exchange membranes and five strong acid type cation exchange membranes disposed alternately, and a 0.5N aqueous solution of sodium sulfate was charged into a cathode compartment 16, enionation compartments 19 and an anode compartment 17. Electrodialysis was performed while maintaining the current density of each of the ion exchange membranes at 5 mA/cm$^2$. The composition of the dialyzed color developer that flowed from the deionation compartments 18 was as shown in column D of Table 5.

Table 4

| Developer chemicals | A Developer | B Waste developer | C Electrolyzed developer | D Electrodialyzed developer | E Revived developer |
| --- | --- | --- | --- | --- | --- |
| Hydroquinone (g/l) | 12.0 | 9.0 | 10.5 | 10.3 | 12.0 |
| Methyl p-aminophenol sulfate (g/l) | 3.0 | 2.5 | 2.8 | 2.7 | 3.0 |
| Anhydrous sodium sulfite (g/l) | 67.5 | 60.0 | 65.0 | 64.0 | 67.5 |
| Sodium carbonate (g/l) | 68.5 | 67.5 | 68.0 | 68.0 | 68.5 |
| Bromine ions (g/l, calculated as potassium bromide) | 0.2 | 1.5 | 1.3 | 0.2 | 0.2 |
| pH | 10.5 | 10.4 | 11.0 | 11.0 | 10.5 |

The electric power required for the above regeneration treatment was 0.020 KWH per liter of the waste developer.

EXAMPLE 5

A color developer having the composition shown in column A of Table 5 was fed into a color developing chamber of a color film processor, and a color negative film was developed. The waste color developer discharged from the developing chamber (having the composition shown in column B of Table 5) was charged into a cathode compartment of an electrolytic cell in which a nickel cathode was separated from a graphite anode by a strong acid type cation exchange membrane.

4-Amino-N-ethyl-N-($\beta$-methanesulfonamide ethyl)m-toluidine sesquisulfate monohydrate, anhydrous sodium sulfite, sodium hydroxide and sodium carbonate were added to the resulting dialyzed color developer D to form a revived color developer having the composition shown in column E of Table 5. A color negative film was developed with the revived color developer under the same conditions as in the case of the color developer A. The characteristics of the developed color photograph were the same as in the case of the color developer A.

Table 5

| Developer chemicals | A Color developer | B Waste color developer | C Electrolyzed color developer | D Dialyzed color developer | E Revived color developer |
| --- | --- | --- | --- | --- | --- |
| 4-Amino-N-ethyl-N-($\beta$-methanesulfonamide ethyl)-m-toluidine sesquisulfate monohydrate (g/l) | 7.0 | 5.0 | 5.2 | 5.2 | 7.0 |
| Anhydrous sodium sulfite (g/l) | 2.3 | 2.0 | 2.2 | 2.1 | 2.3 |
| Sodium hydroxide (g/l) | 0.85 | 0.55 | 0.54 | 0.53 | 0.85 |
| Sodium carbonate monohydrate (g/l) | 50.8 | 50.0 | 50.0 | 49.8 | 50.0 |
| Bromine ions (g/l, calculated as potassium bromide) | 0.50 | 1.20 | 1.20 | 0.50 | 0.50 |
| pH | 10.80 | 10.75 | 10.75 | 10.75 | 10.80 |

The electric power required for the above-mentioned regeneration was 0.030 KWH per liter of the waste color developer.

EXAMPLE 6

Using a developer having the composition shown in column A of Table 6, a black-and-white film was developed. The waste developer having the composition shown in column B of Table 6 was charged into a cathode compartment 5 of an electrolytic cell of the type shown in FIG. 1 in which a stainless steel cathode was separated from a graphite anode by a strong base type anion exchange membrane, and a 0.5N aqueous solution (column A of Table 7) of sodium sulface was charged into an anode compartment 6. Electrolysis was performed while maintaining the current density of the anion exchange membrane at 5 mA/cm$^2$. When the electrolysis was performed for 5 hours, the composition of the catholyte solution (the electrolyzed developer) changed as shown in column C of Table 6. The components of the anolyte solution changed as shown in column B of Table 7.

An aqueous solution of sodium hypochlorite (available chlorine 10%) containing 5 grams of available chlorine per gram of COD of the effluent from the anode compartment (having the composition shown in column B of Table 7) was added dropwise to the effluent from the anode compartment, and the mixture was stirred. It was then neutralized with an aqueous solution of sodium hydroxide. The COD of the effluent from the anode compartment was decreased drastically as shown in column C of Table 7.

Table 6

|  | A Developer | B Waste developer | C Electrolyzed developer |
|---|---|---|---|
| Hydroquinone (g/l) | 8.0 | 6.5 | 7.5 |
| Methyl p-aminophenol sulfate (g/l) | 2.0 | 1.8 | 1.9 |
| Anhydrous sodium sulfite (g/l) | 90 | 85 | 88 |
| Sodium carbonate monohydrate (g/l) | 52.5 | 52.0 | 52.2 |
| Potassium bromide (g/l) | 5.0 | 6.5 | 2.0 |
| COD (ppm) | 25,000 | 25,000 | 25,000 |

Table 7

|  | A Anolyte solution | B Effluent from the anode compartment | C Effluent shown in column B after being treated |
|---|---|---|---|
| Sodium sulfate (g/l) | 35 | 40 | 40 |
| COD (ppm) | 0 | 200 | 1 |

EXAMPLE 7

A color film was developed using a part of a color developer having the composition shown in column A of Table 8. The remaining color developer was divided into two portions. One portion was stored for 60 days in a polyethylene container. The other was charged into a cathode compartment of an electrolytic cell in which a stainless steel cathode was separated from a platinum-plated titanium anode by a strong acid type cation exchange membrane, and a 0.5N aqueous solution of sulfuric acid was charged into an anode compartment. While passing a direct current of 200 mA between the cathode and the anode, it was stored for 60 days. The compositions of the color developer portions after storage in this manner were as shown in columns B and C of Table 8. When a color film was developed with each of the color developers B and C under the same conditions as in the case of the color developer A, the same photographic characteristics as in the case of the color developer A were obtained in the case of the color developer C. But in the case of the color developer B, the photographic characteristics obtained were different from those obtained in the case of the color developer A.

Table 8

| Color developer chemicals | A At the start of storage | B After storage for 60 days in a polyethylene container | C After storage for 60 days by the method of this invention |
|---|---|---|---|
| 4-Amino-N-ethyl-N-(β-methanesulfonamide ethyl) m-toluidine sesquisulfate monohydrate (g/l) | 5.0 | 4.0 | 5.0 |
| Anhydrous sodium sulfite (g/l) | 2.0 | 1.7 | 2.0 |
| Sodium carbonate monohydrate (g/l) | 50.0 | 51.0 | 50.0 |
| Sodium hydroxide (g/l) | 0.55 | 0.57 | 0.55 |
| Potassium bromide (g/l) | 1.0 | 1.0 | 1.0 |
| pH | 10.75 | 10.95 | 10.75 |

I claim:

1. A method for regenerating a waste developer left after processing silver halide photographic materials, which comprises electrolyzing the waste developer using an electrodialytic cell comprising a cathode, an anode and alternating anion exchange membranes and cation exchange membranes arranged therebetween to define a cathode compartment adjacent the anion exchange membrane at one terminal of the cell, a plurality of intermediate enionation and deionation compartments with a set of the deionation compartments alternately disposed between a set of the enionation compartments, and an anode compartment adjacent the cation exchange membrane at the other terminal of the cell; the electrolysis being effected while passing the waste developer through the cathode compartment and charging the effluent from the cathode compartment into the deionation compartments.

2. A method for regenerating a waste developer left after processing silver halide photographic materials, which comprises first electrolyzing the waste developer by passing it through a cathode compartment of an electrolytic cell comprising a cathode, an anode, and an anion exchange membrane disposed therebetween to define the cathode compartment and an anode compartment; and then electrolyzing the effluent from the cathode compartment of the electrolytic cell by passng it through deionation compartments of an electrodialytic cell comprising a cathode, an anode and alternating anion exchange membranes and cation exchange membranes arranged therebetween to define a cathode compartment adjacent the anion exchange membrane at one terminal of the cell, a plurality of intermediate enionation and deionation compartment with a set of the deionation compartments alternately disposed between a set of the enionation compartments, and an anode compartment adjacent the cation exchange membrane at the other terminal of the cell.

3. A method for regenerating a waste developer left after processing silver halide photograhic materials, which comprises first electrolyzing the waste developer by passing it through a cathode compartment of an electrolytic cell comprising a cathode, an anode, and a cation exchange membrane disposed therebetween to define the cathode compartment and an anode compartment; and then electrolyzing the effluent from the cathode compartment of the electrolytic cell by passing it through dionation compartments of an electrodialytic cell comprising a cathode, an anode and alternating anion exchange membranes and cation exchange membranes arranged therebetween to define a cathode compartment adjacent the anion exchange membrane at one terminal of the cell, a plurality of intermediate enionation and deionation compartments with a set of the deionation compartments alternately disposed between a set of the enionation compartments, and an anode compartment adjacent the cation exchange membrane at the other terminal of the cell.

* * * * *